3,320,192
AMINOPLAST MOLDING COMPOUNDS CONTAINING ZINC SULFITE
Joel Ostrowicz, Alagoas 475, Sao Paulo, Brazil
No Drawing. Filed Aug. 1, 1962, Ser. No. 213,904
8 Claims. (Cl. 260—17.3)

This invention relates to improved molding compounds comprising aminoplast resins and to an improved process for making such compounds. It relates more particularly to compounds in which the resin is a mixed urea-melamine-formaldehyde resin and in which is incorporated a latent catalyst for effecting the simultaneous polymerization of the urea and melamine portions of the resin during the molding step. It also relates to the preparation of such compounds by effecting the densification of the resin formulation containing all compounding ingredients by sheeting same on a heated roll mill, the firm sheet produced being suitable for inspection and removal of contaminated areas prior to the grinding of the sheet to form molding compound of desired particle size.

Urea-formaldehyde and melamine-formaldehyde reaction products are used commercially in large quantities for the production of molding compounds. Although they belong to the same aminoplast thermosetting resin class, it has not heretofore been practicable to carry on simultaneous condensation between urea, melamine and formaldehyde in the production and utilization of molding compounds because of different reaction conditions being required for the urea and melamine components.

In the most widely used prior art commercial process for producing aminoplast resin molding compounds, a resin-filler combination is dried to a moisture content of about 1% of the weight of the composition. The dried composition is then ground in a pebble or ball mill for about 8 hours to reduce the product to a fine powder capable of passing, for example, a 300 mesh screen. While such a grinding operation is ostensibly a simple mechanical operation, it represents a critical stage in the ordinary manufacture of aminoplast resin molding compounds. The addition of the conventional accelerators must be carefully timed so as to avoid pre-curing of the resins due to the heat generated in the pebble or ball mill. Although cooling systems can be provided, the heat transfer is not particularly efficient and local overheating is likely to occur. The resultant pre-curing of the resins produces a shortened flow time for the molding compounds during the molding operation. The result is that the mold may not be completely or properly filled and the molded articles are likely not to be good reproductions of the mold pattern.

Another factor in the use of pebble or ball mills for the production of the fine molding powder is the difficulty of cleaning the coloring ingredient from the mill, and especially from the pebbles or balls. This leads to substantial equipment costs because of the tendency to reserve particular mills for use with individual, more standard colors. The mill cleaning cost is sufficient, in the case of short runs with special colors, as to increase the price of the resulting molding compound from on the order of $.47 per pound for standard colored molding compounds to on the order of $.75 per pound for special colored molding compounds. This economic factor is a burdensome one.

Another difficulty with the pebble or ball milling operation is the difficulty of inspecting the powder produced from the standpoint of removing contaminants and non-uniformly colored particles. Coarse aprticles of this type can be removed by careful sifting but, if such particles are subjected to further milling, the additional heating causes further hardening thereof through polymerization of the resin.

The next step in the normal commercial process is the necessary densification of the powder in equipment such as a Banbury mixer. The heating problem encountered in the use of such equipment is critical, and the resulting increase in temperature of the molding compound (prepared with conventional accelerators) advances polymerization and further cuts the flow of the molding compound during the molding operation.

It is an object of this invention to provide a composition and process for making melamine-formaldehyde molding materials with urea as a reactive ingredient to replace a substantial part of the more expensive melamine and to increase at the same time the tensile, flexural and dielectric strength of the composition, to improve the flow thereof during the molding step and to decrease the shrinkage of the resultant molded articles.

It is another object of this invention to eliminate the pebble or ball milling operation and, in fact, to eliminate the necessity for going through the stage of reducing the molding composition to a fine powder form.

Another object is to provide economies through removing less moisture than has been customary in the drying step and using this temporarily retained moisture to aid in the formation of a sheet during the densification step, which sheet can be readily inspected for contaminants and other non-uniformities. Such undesired portions of the sheet can be readily removed, e.g., by the appropriate use of a blade.

A still further object is the acomplishment of the foregoing objects through the use of the novel latent accelerator of this invention.

The desired result of making melamine-formaldehyde molding materials in which urea is incorporated as a reactive ingredient is made possible by the use of zinc sulfite ($ZnSO_3$) as the accelerator for producing simultaneous polymerization of the melamine and urea portions of the aminoplast resin molding compound during the molding step. By the use of this catalyst, it is possible, for the first time, to have a molding powder in which both melamine and urea are present and from which homogeneous molded articles can be produced. The same catalyst can be used for melamine-formaldehyde resins and for urea-formaldehyde resins separately, but the full benefits of this invention are attained when this catalyst is used for effecting the conjoint polymerization of the mixed resins. The resulting molding compound is more economical because of the lower price of urea as compared with the price of melamine and also, as stated above, the properties of the resulting compound are improved when urea is combined with melamine in the production of the molding composition.

The conventional acceleration or catalysts, such as phosphoric, cinnamic, benzoic or phthalic acids, and such as potassium tetraoxalate or toluidine hydrochloride, are inferior to zinc sulfite because of the pre-curing problem met with when they are used in formulations subjected to the heat encountered during processing. The molding formulations containing zinc sulfite can be subjected to heat up to 100° C., as encountered on the heater pressure rolls used in the process of this invention for densification, without the hazard of pre-curing. In previous commercial procedures, the conventional accelerator is added to the formulation at the very last stage of the ball milling in order to minimize pre-curing. Unfortunately, intimate mixing of the accelerator and the other formulation ingredients is also minimized. The novel accelerator of this invention is of such a nature that it can be added to the liquid resin for better mixing, the wet mixture can be partially dried in any conventional dryer, and such dried mixture can be roll milled for densification—all without the hazard of advancing curing before curing is required in the molding operation.

The zinc sulfite is suitably added along with all of the other ingredients to the wet mixture discharged from the reaction vessel in which the liquid resin is formed. Zinc sulfite has the desirable property of acting as a catalyst for the final stage of polymerization only at the temperatures encountered during the molding cycle, namely, 120°–160° C. The zinc sulfite will not react and will not advance polymerization during the drying and densification stages where the temperature reaches a maximum of 85°–100° C. It may suitably be used together with a stabilizer such as hexamethylene tetramine, which stabilizer retards polymerization during storage and thus prevents loss of flow properties during the molding cycle. Zinc sulfite, when used in conjunction with a stabilizer such as hexamethylene tetramine, replaces with advantage the much more costly conventional accelerators or catalysts, which have to be used with dry material only and which do not permit, because of the risk of premature curing of the molding compound, milling on heated rolls for final drying and densification.

When zinc sulfite is incorporated in the molding compounds of this invention, the weight ratio of urea to melamine in the urea-melamine-formaldehyde resin can suitably range from about 1:10 to about 2:1. A preferred range for this weight ratio is from about 1:1.5 to about 1.5:1. It is in these ranges that the improved tensile, flexural and dielectric strength properties, as well as the improved flow during molding and the lowered shrinkage of the molded articles, are achieved. It is possible, of course, to use smaller amounts of urea but, in such case, the full benefits of this invention are not reached. Higher amounts of urea can also be used, but only at the sacrifice of reducing the resistance of resulting molded articles to boiling water. However, the use of zinc sulfite does improve the resistance of molded articles, prepared from the molding compounds of this invention, to hot water.

The zinc sulfite is desirably included in the molding compounds of this invention in an amount ranging from about 0.6 to about 1.2 weight percent, based on the weight of the molding compound on a dry basis. Other ingredients may suitably be included along with the zinc sulfite, although it is the presence of the latter compound which is critical to obtaining the improved results of this invention. A useful additional ingredient is an ester of a monohydric alcohol and a polybasic carboxylic acid, which is suitably used in an amount of from about 0.1 to about 0.3 weight percent, based on the weight of the molding compound on a dry basis. Such an ester acts as an additional stabilizer in that it increases the temperature at which the zinc sulfite becomes active as a polymerization catalyst. The ester also improves the flow of the molding compound during the molding cycle. Dibutyl phthalate is a particularly suitable stabilizing ester. Other suitable examples of such esters are: diethyl phthalate; di-2-ethylhexyl phthalate; dicapryl phthalate; dimethoxyethyl phthalate; diethoxyethyl phthalate; dibutoxyethyl phthalate; dibutyl sebacate; dibutyl tartrate; and dimethylcyclohexyl adipate.

Another optional ingredient is a polyalkylene glycol having a molecular weight of up to about 400. The alkylene units of such a glycol should suitably contain from 2 to 6 carbon atoms. A preferred glycol is diethylene glycol. The presence of the glycol assists in improving the flow properties of the molding compound during the molding cycle. The glycol is suitably used in an amount of from about 0.1 to about 0.5 weight percent, based on the weight of the molding compound on a dry basis.

The molding compounds of this invention can be made by any known method. However, it is greatly preferred that the process of this invention be utilized for this purpose because of the greatly improved results which can thereby be realized. In general, the process of this invention comprises mixing the liquid aminoplast resin, as discharged from the vessel in which the resin is produced, with all of the compounding ingredients comprising a filler, accelerator, pigment and stabilizer; introducing the resultant mixture into a dryer and effecting the removal of water until the water content of the mixture is in the range from about 8 to about 12% by weight of the mixture; sheeting out the partially dried mixture by introducing same into the nip between differentially heated, rotating rolls; removing the resultant sheet from the cooler roll after several revolutions thereof, and inspecting and removing any contaminated areas from the sheet; and reducing the sheet to molding compound particles of desired size by subjecting same to the operation of standard grinding equipment, such as cutters or hammer mills.

The ingredients, not already mentioned, of the molding compounds produced by the process of this invention are selected from those known to the prior art. The filler to be used is alpha-cellulose, particularly in combination with barium sulfate, although wood flour, paper, cotton, canvas, asbestos, mica flakes, pearl shell chips, synthetic or natural filaments, glass fibers and fabric materials can optionally be used for industrial grades of molding compounds. It has been found to be particularly advantageous to utilize a mixture of pure alpha-cellulose and barium sulfate. This novel use of barium sulfate aids in the dispersion and absorption of the coloring matters in the wet mixture, and effects lowered shrinkage in the molds as well as lowered distortion under heat of the molded articles. The best results are attained when the filler is a mixture of from about 25 to about 45 weight percent of pure alpha-cellulose and from about 12 to about 20 weight percent of barium sulfate, both weight percentages being based on the weight of the molding compound on a dry basis.

Any undesirable coloring material, pigment or dyestuff, which is stable at molding temperatures on the order of 120°–160° C., can suitably be used in the molding compounds produced by the process of this invention. Lubricants such as zinc stearate, stabilizers such as magnesium carbonate, hexamethylene tetramine and the like, and additional ingredients, such as plasticizers, as desired can suitably be used in the molding compounds produced by the process of this invention. All of these ingredients can be used in normal quantities. It will be understood that no additional ingredients, including plasticizers other than esters of a monohydric alcohol and a polybasic carboxylic acid and polyalkylene glycols, need be used, but that the use of such additional ingredients is not outside of the scope of this invention.

The resins which are subjected to the process of this invention are prepared in the usual way by the interaction of the selected ingredients, which include a combination of urea, melamine and aqueous formaldehyde. The partially cooled resin from the reaction kettle is then mixed with all of the other ingredients of the final molding compound. The type of mixer is not material, but the use of a covered dough-mixer (of the Werner & Pfleiderer type) has been found to be quite satisfactory. After thorough mixing, which may take up to 2 hours (including the time for loading and unloading), the mixture is charged to a dryer of a batch or continuous type. For example, the compounded resin mixture may be dried on racks which are placed in the dryer or continuous conveyor drying may be used effectively at temperatures of 85°–100° C. One feature of this invention, which makes it more economical because less energy is required in the drying step, is that the compounded resin mixture is dried only to the point where it still contains from about 8 to about 12% of water, based on the weight of the composition.

Instead of reducing the compounded resin mixture to a fine powder in a pebble or ball mill, an operation which would be highly difficult in the partially moist condition of this mixture, the compounded resin mixture is passed through the nip of a set of differentially heated pressure rolls. A two-roll calender or other type of heated roll mill is suitable for this operation. It is preferable that the rolls have highly polished steel surfaces, but the steel need not be of the stainless type. The compounded resin mixture forms a firm sheet which adheres to the cooler roll. The milling of a particular charge is continued until such a sheet has been formed and has been rendered homogeneous by the coaction of the mill rolls, an operation which normally requires from about 1½ to about 4 minutes. The presence of the moisture assists in the formation of firm sheeting. Also, as indicated above, the production of such sheeting is practically possible only because of the characteristics of the novel accelerator of this invention. Because of the application of heat and pressure by means of the rolls, the resulting sheets are completely dried and densified. When this condition is attained, the formed sheet is removed from the pick-up or sheeting roll with the aid of a cutting blade.

The temperature of one of the rolls of the mill is desirably maintained in the range from about 75° to about 85° C. Another of the mill rolls is preferably maintained at a temperature which is about 20° C. below the temperature of the hotter roll, the lower limit for the temperature of the cooler roll being about 50° C. As a further aid in applying effective pressure during the sheet formation, the rolls may be maintained at different speeds, although they will always be rotating in the same direction at the nip. It is preferable that the pick-up roll be rotated about 6 r.p.m. faster than the other roll, the maximum speed for the pick-up roll being about 40 r.p.m. The minimum distance between the rolls can be adjusted as desired, but it has been found that a sheet having a thickness from about $\frac{1}{16}''$ to about $\frac{1}{8}''$ can be most effectively inspected in the next step of the process of this invention. The size of the rolls is not critical, but it has been found that 42" x 16" rolls are a convenient size. As has been mentioned, when it is desired to change the color of the molding compound being processed, the same mill can be conveniently used since the surfaces of the rolls are readily cleaned by wiping (with the aid of a solvent, if desired). Because of this easy cleaning factor, the production of molding compounds of any color can be done economically in short runs by the process of this invention without any substantial cost differential being required.

The firm sheet produced on the roll mill has not been a feature of any previous process for making high quality, alpha-cellulose filled aminoplast resins in white or pastel colors. In addition to the ease with which the roll mill produces homogeneity and densification in the sheet, this sheet is in a form which can be readily handled and inspected for the removal of contaminated areas, dirt specks and the like. The sheet is suitably placed on an inspection belt conveyor en route to the final stage of the process in which the granulated molding compound is obtained. The conveyor belt should be clear or translucent so as to permit the transmission of light through the belt, a source of light being placed under and directed at the load carrying surface of the belt. Suitable materials for the formation of the belt are polyolefin resins, although the main criterion for the belt is that it be suitable for transmitting light for the inspection of the sheeted molding compound. Actually, the inspection need not be conducted on a travelling surface, and can suitably be made on a stationary clear or translucent surface. As indicated, any contaminated areas in the sheet can be readily removed by the use of a blade or other convenient tool. This operation results in the reduction of waste to a minimum, since it is no longer necessary to wait for an inspection of a molded article to locate non-uniformities. In prior art processes where the material is not sheeted, there is no convenient method for the inspection of the molding compound during processing and it is only in the inspection of the final molded articles that the undesirable non-uniformities can positively be located; but, at that stage, they can not be removed.

The inspected, dry resin sheets are conveyed to a cutter, hammer mill or other device for grinding the molding compound into desired particle size. The usual types of sieves or screens can be utilized for segregating the ganulated molding compound into uniform particle size.

The densification of molding compounds so that the bulk factor is reduced to at least about 2.5 is important to successful molding operations. A molding compound in the form of a fine powder can be used only when the loading cavity of the mold has a volume which is more than five times that of the piece to be fabricated, but such a mold can be ruled out from practical consideration because of the excessive weight and cost. A fine powder, too, is difficult to preform except in heavy-duty rotary tableting machines. The densification step of this invention readily produces molding compounds having the desired lowered bulk factor.

The following is a specific example of the product and process of this invention:

*Example*

The following ingredients are charged to a resin kettle:

| | |
|---|---:|
| (37%) Commercial aqueous formaldehyde __kgs__ | 223.5 |
| Commercial aqueous ammonia (26° Bé. grade) __liters__ | 2.55 |
| Melamine __kgs__ | 48.9 |
| Urea __kgs__ | 64.5 |
| Hexamethylene tetramine __kg__ | 0.9 |

These ingredients are reacted at about 60° C. for approximately 1 hour at a pH of 7.5, and are thereafter refluxed at a temperature of about 95° C. for 10 minutes. After being cooled to 40° C., the liquid resin is discharged through a filter system (to remove tramp dirt and possibly undissolved reactants) to a Werner & Pfleiderer mixer where all of the remaining ingredients for the production of a highly satisfactory molding compound are added, as follows:

| | Kgs. |
|---|---:|
| Pure alpha-cellulose | 60 |
| Barium sulfate | 28.65 |
| Zinc stearate | 2.01 |
| Zinc sulfite | 1.8 |
| Hexamethylene tetramine | 0.87 |
| Magnesium carbonate | 0.225 |
| Dibutyl phthalate | 0.75 |
| Titanium dioxide | 1.8 |

After 2 hours of mixing (including the time required for loading and unloading), the mixture, containing approximately 40% of moisture at this stage, is discharged and placed in trays in a heated dryer at a temperature of 85°–100° C. The mixture was retained in the dryer only long enough for the moisture content to be reduced to 10% based on the weight of the composition. This partially moist material, after being removed from the dryer, is passed through a two-roll calender. The cooler roll is maintained at a temperature of about 50° C. and is rotated at a speed of about 34 r.p.m. The other roll is run at a speed of about 28 r.p.m. and is maintained at a temperature of about 80° C. Due to the differential speed and temperature of the rolls, after 3–4 minutes of rolling, a firm sheet forms and adheres to the faster and cooler roll. At this point, the sheet is removed from this roll by means of a knife edge, and is inspected for contaminated areas on the already described inspection belt conveyor. Any non-uniformities are removed with the aid of a blade. The now uniform sheets, which are $\frac{1}{10}''$ in thickness, are now charged to a hammer mill where, with the aid of sieves having 1, 2 or 3 mm. openings, the resulting granulated particles of molding compound are separated to produce a uniform particle size. Portions of this molding compound were molded to produce high quality finished articles in the form of dinner plates. The latter, on inspection, were completely uniform and without flaws.

The calendar rolls of this example were 42″ x 16″ in size. The output of one such calendar is on the order of 235 pounds per hour.

As an indication of the tremendous savings which can be effected through the use of the formulation and process of this invention, the investments required for a 25,000,000 pound per year plant for the manufacture of aminoplast resin molding compounds were calculated on the bases of the equipment required for the prior art process using ball mills and Banbury mixers as contrasted with that essential to the present process. The investment required for the prior art process is on the order of $10,000,000, on the basis of the requirement for reserving several units for use with particular colors, whereas the corresponding investment for a plant designed to use the formulation and the process of this invention is on the order of $1,800,000.

It will be appreciated that this invention provides a formulation and method for the production of combined melamine-urea-formaldehyde molding compounds of the highest quality. This has resulted in molding compounds combining the optimum properties of melamine and urea resins, namely, the excellent heat resistance, impact strength, hardness and low water absorption of the melamine resin, and the better tensile strength, flexural strength, dielectric strength, plasticity and lower shrinkage of the urea resins. A catalyst, zinc sulfite has been provided which enables the conjoint polymerization of the urea and melamine portions of the resin to form attractive, homogeneous molded articles. An important feature of this catalyst is that it does not become active in promoting polymerization at temperatures below 110° C., whereas prior art melamine catalysts, such as already mentioned, become active in promoting resin polymerization at 60°–65° C. and are even active in advancing the cure of the resins during storage at room temperature. Even if such prior art catalysts were otherwise satisfactory, they would not be suitable in the process of this invention during which temperatures of 85°–100° C. are attained for brief periods.

Since certain changes in carrying out the above described process may be made without departing from the spirit of this invention, it is intended that all matter contained in the above description shall be interpreted as illustrative and not in a limiting sense. Modifications may be resorted to within the scope of the invention as described and claimed.

Having thus described my invention, what I claim and desire to protect by Letters Patent is:

1. An aminoplast resin molding composition comprising a urea-melamine-formaldehyde resin, the ratio of urea to melamine in said resin being from 1:10 to 2:1, a filler, a colorant, a stabilizer and an accelerator comprising a zinc compound consisting of zinc sulfite of the formula $ZnSO_3$ in an amount of from 0.6 to about 1.2 weight percent, based on the weight of said composition on a dry basis.

2. A process for the production of an aminoplast molding compound which comprises densifying to a bulk factor of about 2.5 a composition comprising a urea-melamine-formaldehyde resin, a filler, a colorant, a stabilizer, and from 0.6 to 1.2 weight percent, based on the weight of said composition on a dry basis of an accelerator comprising a zinc compound consisting of zinc sulfite of the formula $ZnSO_3$ about 8 to about 12% of water based on the weight of said composition, by passing said composition through the nip of differentially heated pressure rolls so as to form a homogeneous, firm sheet on the cooler roll, said cooler roll being maintained at a temperature about 20° C. below the temperature of the other roll, said other roll being maintained at a temperature from 75° to about 85° C., and subsequently processing said sheet to form a molding compound of desired particle size.

3. The process of claim 2, in which said sheet is inspected for contaminants and other non-uniformities by placing said sheet on a light transmitting conveyor belt, shining a light at the underside of the upper run of said belt and visually inspecting for such non-uniformities, and in which said non-uniformities are removed with the aid of a blade.

4. The composition of claim 1, to which is added from about 0.1 to about 0.3 weight percent, based on the weight of said composition on a dry basis, of an ester of a monohydric alcohol and a polybasic carboxylic acid.

5. The composition of claim 4, in which said ester is dibutyl phthalate.

6. The composition of claim 4, to which is added from about 0.1 to about 0.5 weight percent, based on the weight of said composition on a dry basis, of a polyalkylene glycol having a molecular weight of up to about 400.

7. The composition of claim 6, in which said glycol is diethylene glycol.

8. The composition of claim 1, in which said filler is a mixture of from about 25 to about 45 weight percent of pure alpha-cellulose and from about 12 to about 20 weight percent of barium sulfate, said weight percent being based on the weight of said composition on a dry basis.

References Cited by the Examiner

UNITED STATES PATENTS

| | | | |
|---|---|---|---|
| 2,377,867 | 6/1945 | D'Alelio | 260—39 |
| 2,407,599 | 9/1946 | Auten et al. | 260—67.6 |
| 2,769,798 | 11/1956 | Meis et al. | 260—17.3 |
| 3,008,205 | 11/1961 | Blaies | 260—31.8 |
| 3,093,608 | 6/1963 | Vale et al. | 260—67.6 |
| 3,169,939 | 2/1965 | Cordts | 260—39 |

FOREIGN PATENTS 1,123,462  2/1962  Germany.

WILLIAM H. SHORT, *Primary Examiner.*

JAMES A. SEIDLECK, *Examiner.*

J. NORRIS, *Assistant Examiner.*